US006902407B2

(12) United States Patent
Ito et al.

(10) Patent No.: US 6,902,407 B2
(45) Date of Patent: Jun. 7, 2005

(54) CONTACTING STRUCTURE OF A CARD CONNECTOR

(75) Inventors: Toshiyasu Ito, Togane (JP); Minoru Ohara, Ome (JP)

(73) Assignees: Yamaichi Electronics Co., Ltd., Tokyo (JP); Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/652,198

(22) Filed: Sep. 2, 2003

(65) Prior Publication Data

US 2004/0113249 A1 Jun. 17, 2004

(30) Foreign Application Priority Data

Sep. 2, 2002 (JP) ........................................ 2002-257114

(51) Int. Cl.[7] .............................................. H01R 12/00
(52) U.S. Cl. ...................... 439/60; 439/630; 439/924.1; 439/946
(58) Field of Search ...................... 439/60, 630, 924.1, 439/946, 159, 160, 188, 489

(56) References Cited

U.S. PATENT DOCUMENTS

| | | | |
|---|---|---|---|
| 4,849,944 A | * | 7/1989 | Matsushita .................. 714/718 |
| 5,892,213 A | | 4/1999 | Ito et al. |
| 6,056,573 A | * | 5/2000 | Nishioka .................... 439/326 |
| 6,402,529 B2 | | 6/2002 | Saito et al. |
| 6,527,590 B2 | * | 3/2003 | Oguchi ........................ 439/630 |
| 6,685,512 B2 | * | 2/2004 | Ooya .......................... 439/630 |

FOREIGN PATENT DOCUMENTS

| | | |
|---|---|---|
| JP | 2000-173717 | 6/2000 |
| JP | 2001-143788 | 5/2001 |
| JP | 2002-100440 | 4/2002 |
| JP | 2002-110291 | 4/2002 |
| JP | 3396457 | 2/2003 |

OTHER PUBLICATIONS

Takahashi, Takuya et al., "IC Card and Semiconductor Integrated Circuit Device Package", U.S. Appl. No. 10/442,959, filed May 22, 2003.
Official Notice of Rejection in Japanese Patent Application 2002-257114, dated Dec. 17, 2004.

* cited by examiner

*Primary Examiner*—Ross Gushi
(74) *Attorney, Agent, or Firm*—Finnegan, Henderson, Farabow, Garrett & Dunner, LLP

(57) ABSTRACT

There are provided for an improved card connector contacting structure featuring its compactness and simplicity in construction, higher reliability of contacting action and higher impact resistance. The contacting structure is designed as a card connector comprising a plurality of contact terminals which are arranged in parallel with one another; among the plurality of contact terminals, at least two are the terminals for connecting with the power source; at least two are the terminals for grounding; at least one is for detecting whether the IC card has been loaded securely into the card connector; among the plurality of contact terminals, one of the terminals for grounding comes into contact first with the corresponding external contact of the IC card, among the plurality of contact terminals, the terminal for detecting the card coming into contact last with the corresponding external contact of the IC card.

10 Claims, 15 Drawing Sheets

CONTACTING STRUCTURE OF A CARD CONNECTOR

This application claims priority from Japanese Patent Application No. 2002-257114 filed Sep. 2, 2002, which is incorporated hereinto by reference.

BACKGROUND OF THE INVENTION

1. Field of the Invention

The present invention relates to a card connector designed for the connection between an electronic apparatus, such as digital cameras, mobile telephones or the like, and an IC card, more particularly, to a contacting structure of the card connector whose contact terminal structure for the electrical contact with the IC card is improved.

2. Description of the Related Art

For electrical apparatuses such as digital cameras, mobile telephones or the like, it is becoming commonplace to extend various functions thereof by incorporating an IC card containing the built-in CPU and a memory IC.

The card connector is designed for permitting free insertion for loading and free removal for unloading of the IC card and is provided with a plurality of contact terminals, which are arranged within a housing for obtaining the contacts with a plurality of external contacts (hereinafter referred to as "pads") provided either on the surface or the back of the IC card, so that the IC card can be connected electrically with various signal processing circuits or the power source circuit on the side of the electronic apparatus.

Conventionally, it has been a common practice that the IC card to be loaded into the conventional card connector is provided with a relatively small number of pads, such as 8 pads, especially in the cases of those IC cards which are provided with the controller such as the CPU.

In the other conventional case, the card identification (detection) switch for confirming that the IC card is securely loaded into the card connector is provided at the farthest end of the card connector separately from the contact terminals to be connected with the pads of the IC card (Example: Japanese Patent Application Laid-Open No. 2001-143788).

In recent years, greater compactness and greater functional advance of electronic apparatuses, such as digital cameras and mobile telephones, have been pursued and realized. On the other hand, however, as the performance of electronic apparatuses advances, there has occurred the need for IC cards having larger storage capacity, as experienced in the case of the IC cards for processing image data, such as the XD picture card (TM) and the like. This has resulted in an increase in the size of the IC card itself. Since such a tendency concerning the IC card is a drawback to the pursuit of greater compactness of the electronic apparatus, it is becoming increasingly common to incorporate the controller such as the CPU, which has conventionally been incorporated into the IC card, into the electronic apparatus. Therefore, it has become a common practice to use the IC card provided only with the memory function to reduce the size thereof. As a result, it has become necessary to more than double the number of pads on the IC card, since the pads are necessary for the exchange of the data with the electronic apparatus. Such need has given rise to further need for reducing the pitch (to ½ or less of the conventional pitch) for the arrangement of the contact terminals, as well as the need for reducing the size (width, length, etc.) of the contact terminals themselves.

Such reduction in the pitch of the arrangement and the size of the contact terminal can cause the possible disagreement between the pads of the IC card and the contacts of the contact terminals, the fall of the impact resistance of each contact terminal itself and the fall of the reliability on the electrical contact between each contact terminal and each pad of the IC card. In making the connection with the power source circuit, it is especially important to prevent the instantaneous interruption of the power supply resulting from the vibration and the impact.

As a means for ensuring the electrical contact between each pad of the IC cards and each contact terminal when the vibration and the impact have been generated, a method characterized by dividing the contact portion at the front end of the contact terminal into two parts has been proposed (Refer to Japanese Patent Application Laid-Open No. 2002-100440). However, such attempt is not desirable due to the reasons that dividing the contact portion of the contact terminal into two parts will cause the increase in the time and the cost required for manufacturing because of the fact that the pitch of the arrangement and the sizes of the contact terminals have already been reduced substantially compared with the conventional ones.

Besides, in the case where the card identification switch is provided on the farthest end of the card connector separately from a plurality of the contact terminals arranged in parallel with one another, such composition tends not only to make the connector structure complex but also to increase the number of the parts due to the reason such that the contact terminals for the connection with the printed circuit board of the card identification switch needs to be provided.

In consideration of the problems discussed above, the object of the present invention is to provide a contacting structure of the card connector improved in compactness and simplicity, as well as to provide the card connector with a higher contact reliability and a higher impact resistance.

SUMMARY OF THE INVENTION

In order to accomplish the object as is described above, the contacting structure of the card connector according to the present invention comprises a plurality of contact terminals arranged in parallel to one another along an IC card inserting direction corresponding to a plurality of the external contacts of the IC card. The contacting structure of the card connector is characterized by that, among the plurality of the contact terminals, at least two are contact terminals for connecting with a power source, that, among the plurality of the contact terminals not including those for connecting with the power source, at least two are contact terminals for grounding, that, among the plurality of the contact terminals not including those for connecting with the power source and those for grounding, at least one is for detecting whether the IC card has been securely loaded into the card connector, that one of the at least two contact terminals for grounding comes into contact first with the corresponding external contact of the IC card, and that, among the plurality of the contact terminals, the contact terminal for detecting the IC card comes into contact last with the corresponding external contact of the IC card.

Further, another contacting structure of the card connector according to the present invention comprises a plurality of contact terminals arranged in parallel with one another along an IC card inserting direction corresponding to a plurality of external contacts of the IC card, and the contacting structure of the card connector is characterized by that, among the plurality of the contact terminals, at least two are the contact terminals for connecting with a power source, that, among the plurality of the contact terminals not including the contact terminals for connecting with the power source, at least two are contact terminals for grounding, that, among the plurality of contact terminals not including those for connecting with the power source and those for grounding, at least one is the contact terminal for detecting whether the IC card is securely loaded into the card connector, and that at least the two contact terminals for connecting with the power source are in contact with one external contact disposed at another end of the outermost ends of the IC card.

Further, the contacting structure of the card connector according to the present invention may be the combination of the above-mentioned two contacting structures.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The present invention will be described in detail referring to FIGS. 1 through 15.

Figure 1:
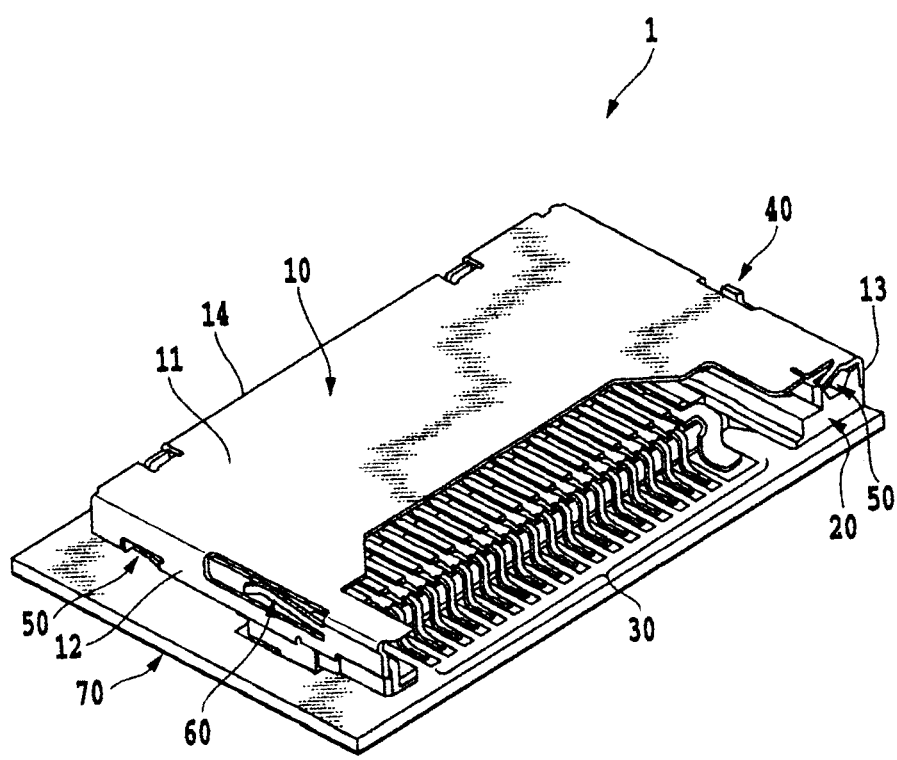
FIG. 1 is a perspective top view of the card connector according to the present invention installed on the printed circuit board.
Figure 2:
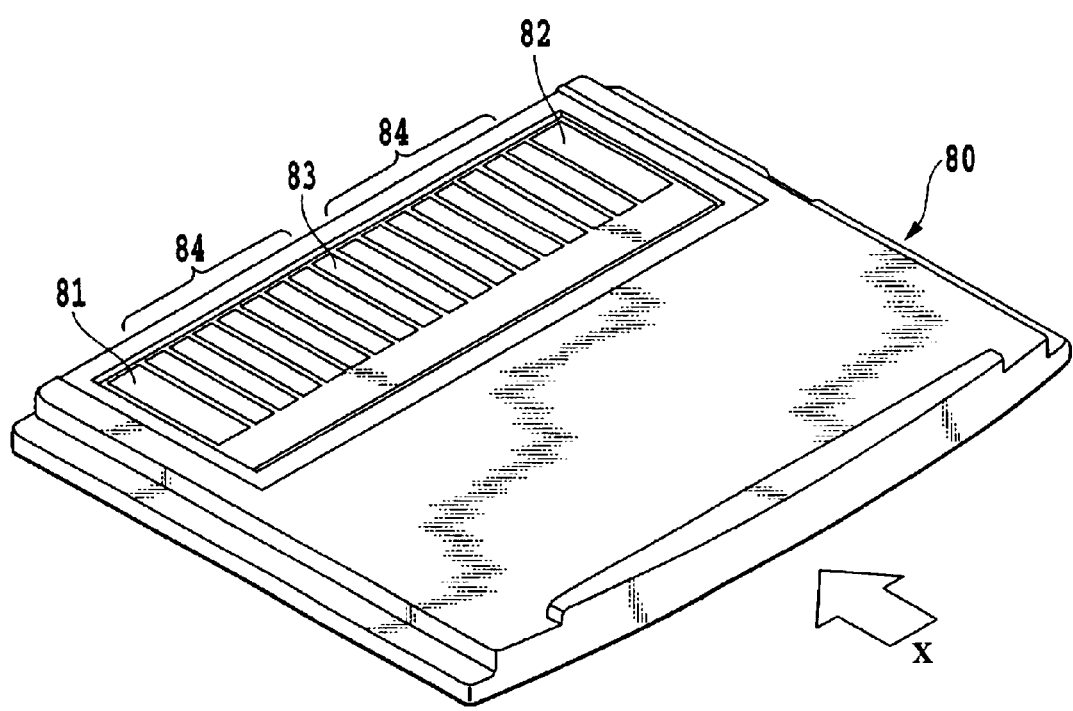
FIG. 2 is a perspective bottom view of the IC card loaded into the card connector according to the present invention.
Figure 3:
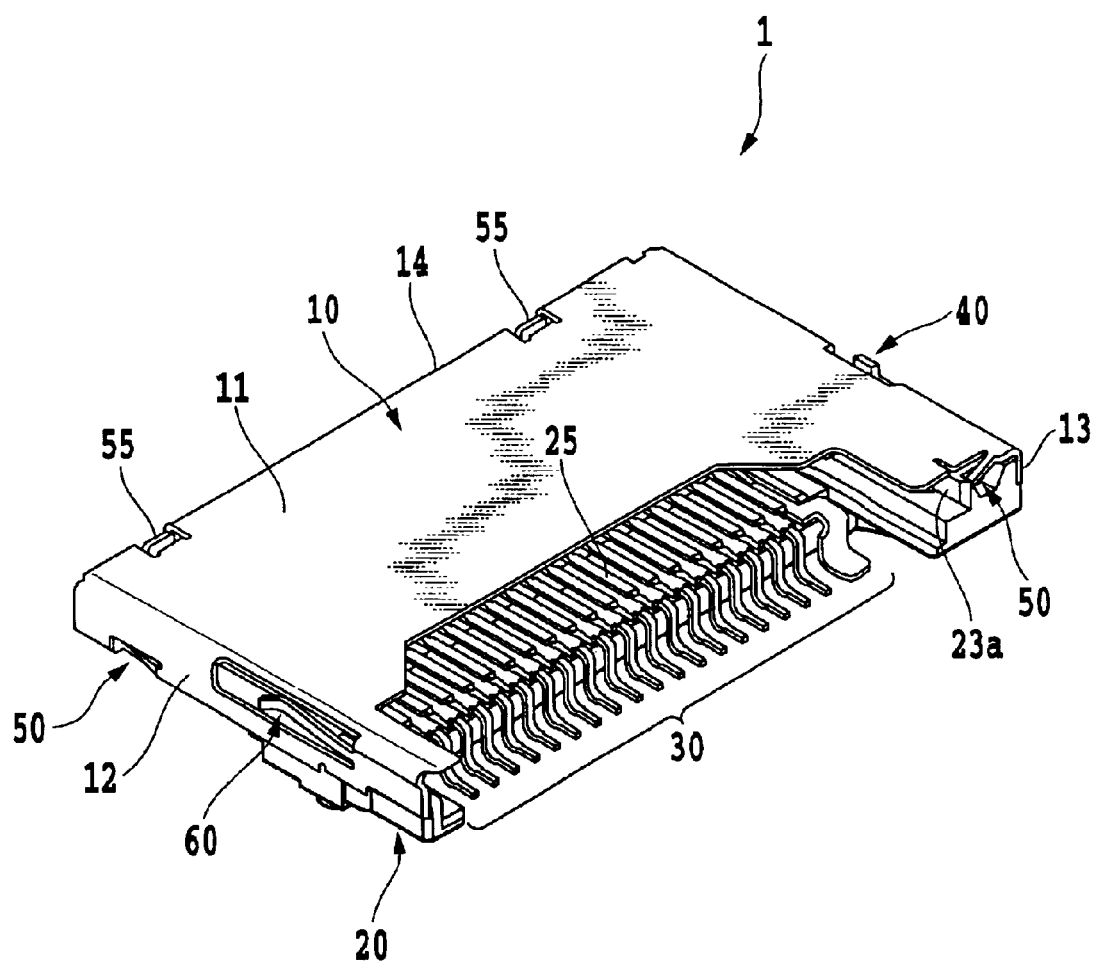
FIG. 3 is a perspective top view of the card connector according to the present invention.
Figure 4:
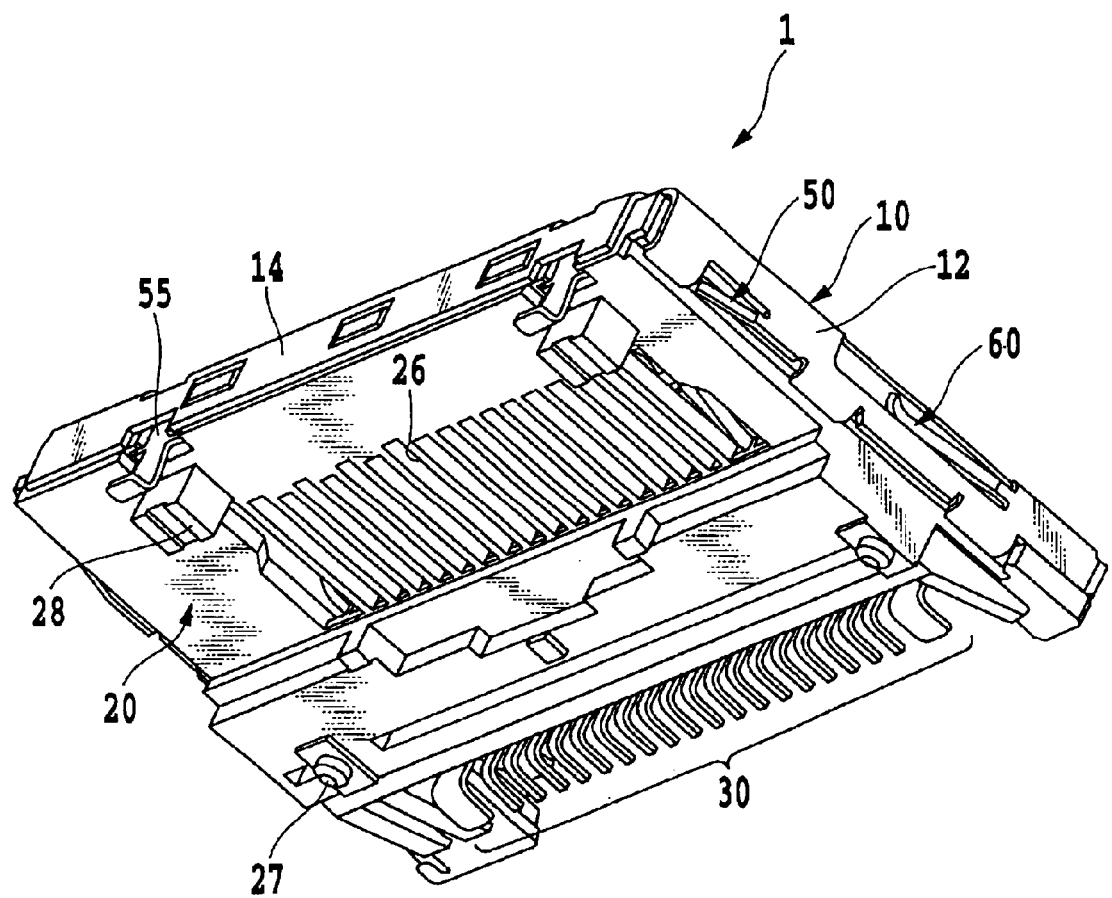
FIG. 4 is a perspective bottom view of the card connector according to the present invention.
Figure 5:
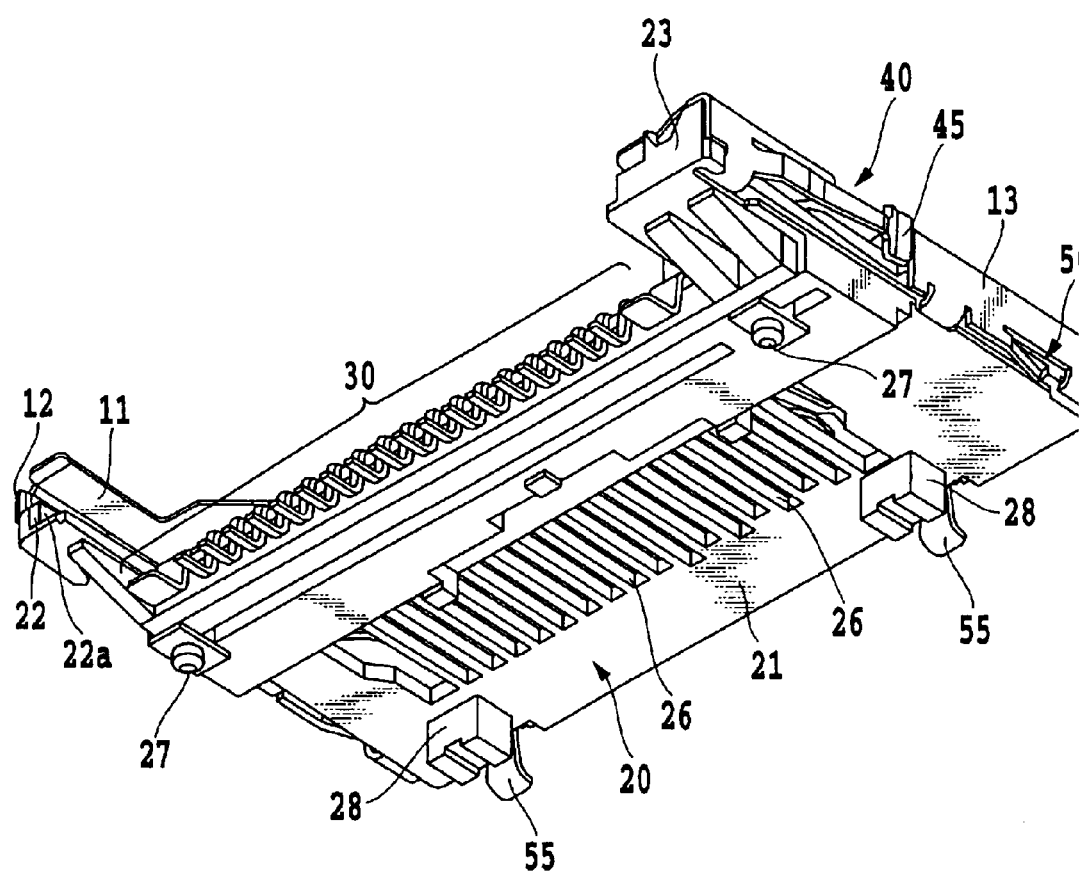
FIG. 5 is a perspective bottom view of the card connector according to the present invention viewed from an angle differing from that of FIG. 4.
Figure 6:
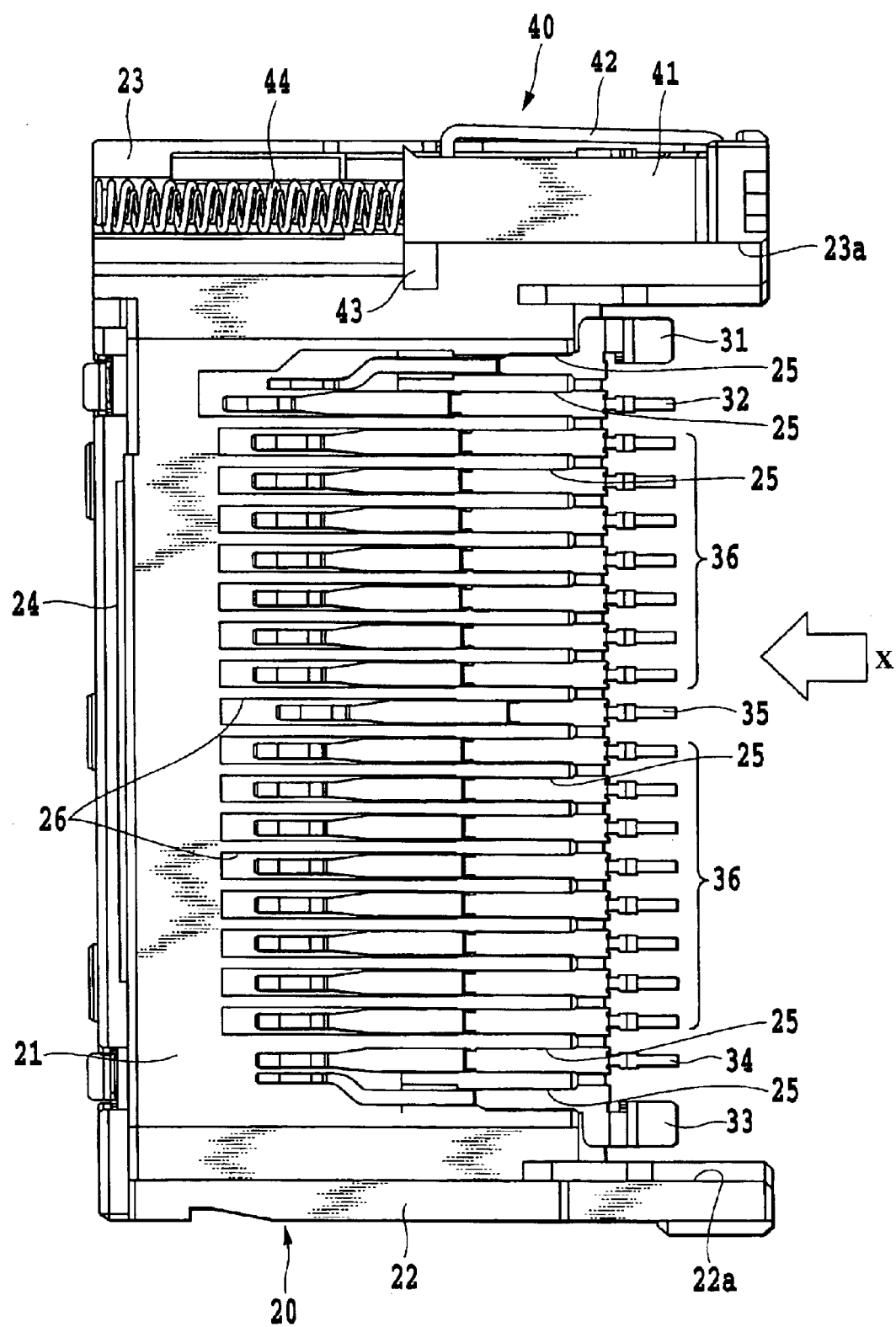
FIG. 6 is a schematic plan of the card connector according to the present invention with the upper housing thereof removed.

FIGS. 1 through 6 show the card correctors according to the present invention, of which FIG. 1 is a perspective top view of a card connector installed on the printed circuit board; FIG. 2, a perspective bottom view of an IC card installed on a card connector; FIG. 3, a perspective top view of the card connector; FIG. 4, a perspective bottom view of the card connector; and FIG. 5, a perspective bottom view of the card connector viewed from a different angle; FIG. 6, a schematic plan of a card connector with its upper housing removed.

The card connector according to the present invention is applicable to the electronic apparatuses such as the digital cameras, PDA's (Personal Digital Assistants), PC's (Personal Computers), mobile telephones, USB's (Universal Serial Buses), reader-writers, personal computer card adaptors or the like.

The card connector 1, as is shown in FIG. 1, is soldered to the corresponding connection terminals of the printed circuit board 70 of the electronic apparatus concerned through the contact terminal 30.

IC card 80 to be loaded into the card connector 1 is, as shown in FIG. 2, provided with a plurality of pads (18 pads according to the present embodiment). The pads disposed on both sides of the IC card 80 respectively are the pad 81 for grounding and detecting the IC card and the pad. 82 for connecting with the power source. Further, the pad disposed substantially at the center (the 9th pad counting from the pad 81 for grounding and detecting IC) serves as the pad 83 for grounding. Other pads 84 are the pads for exchanging the data with the memory or communicating These pads are equal in length in the direction X, in which the card is inserted into the card connector. Further, as described later, the pads 81 and 82, disposed on one end and the other end of a plurality of pads on the IC card 80, respectively are formed somewhat wider than other pads in the direction orthogonal to the direction X in which the card is to be inserted so as to be able to contact with the two contact terminals 30.

Next, the structure of the card connector 1 will be described briefly. The card connector 1 comprises an upper housing 10 and a lower housing 20.

The upper housing 10 is formed from a sheet metal by applying the punching and pressing processes and comprises a ceiling 11, a first side wall 12, a second side wall 13 and a back wall 14 so as to cover the lower housing 20 from above. Further, the first side wall 12 and the second side wall 13 of the upper housing 10 are provided with a cam lever holder 45 for the ejection mechanism 40, which is designed for assisting the card in being inserted into and ejected from the card connector 1, a fixing member 50 for fixing the upper housing to the lower housing and a braking member 60 for preventing the IC card from slipping out. The cam lever holder 45, the fixing member 50 and the braking member 60 are formed by punching process at the predetermined positions. Further, the back wall 14 is provided with L-shape stationary metal members 55, whose legs can be soldered for fixing the card connector 1 to the printed circuit board 70.

The lower housing 20 comprises a bottom wall 21, whereon there are provided a plurality of fixing grooves 25, formed for permitting the contact terminals 30 to be pushed thereinto for being held securely, the first side wall 22, the second side wall 23 and the back wall 24. The space for inserting the IC card 1 is formed by these walls and the ceiling member 11 of the upper housing 10. The numerals 22a and 23a represent the internal wall surfaces of the first side wall 22 and the second side wall 23, which serve for guiding the IC card 1 to be inserted or ejected. Further, the numeral 26 represents the through holes, which are formed passing through the bottom wall 21, corresponding to the plurality of the fixing grooves 25 and extending farther in the direction X in which the IC card is to be inserted. The numeral 27 represents a projection for setting the relative position to the printed circuit board 70. The numeral 28 represents the spacer between the card connector 1 and the printed circuit board 70. Both (the projection 27 and the spacer 28) are located on the back of the bottom wall 21 and molded integrally with the lower housing 20. Further, the second side wall 23 is provided with an ejection mechanism 40 for assisting the insertion and ejection of the IC card. The numeral 41 represents an ejection member having a heart cam (not shown) constituting the ejection mechanism 40. The numeral 42 represents the cam lever of the ejection mechanism 40. The numeral 43 represents an engagement member for engaging with an IC card, the engagement member 43 being formed integrally with the ejection mechanism 40. The numeral 44 represents a compression spring for the ejection mechanism 40.

The lower housing 20 is molded from the plastic materials such as the LCP (Liquid Crystal Polymer) or the PA-9T (Denatured Polyamide). A plurality of contact terminals 30 are arranged substantially parallel to one another and fixed within the grooves 25 of the lower housing 20.

Referring to FIG. 6 again and further referring to FIGS. 7 through 12, the structure, arrangement and the fashion of the contact between each of the pads 81 through 84 and each of the contact terminals 30 according to the present invention will be described.

Figure 7:
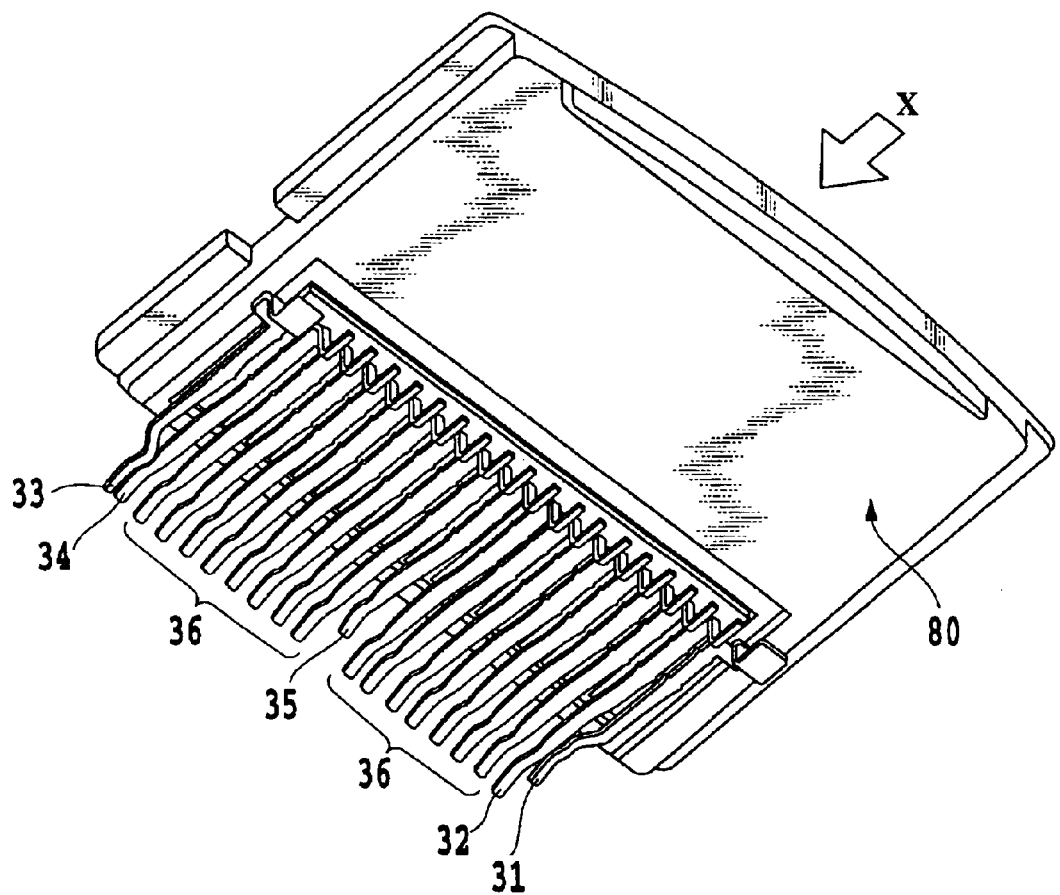
FIG. 7 is an illustration showing the condition in which the pads of the inserted IC card and the contact terminals are not in contact with one another.
Figure 8:
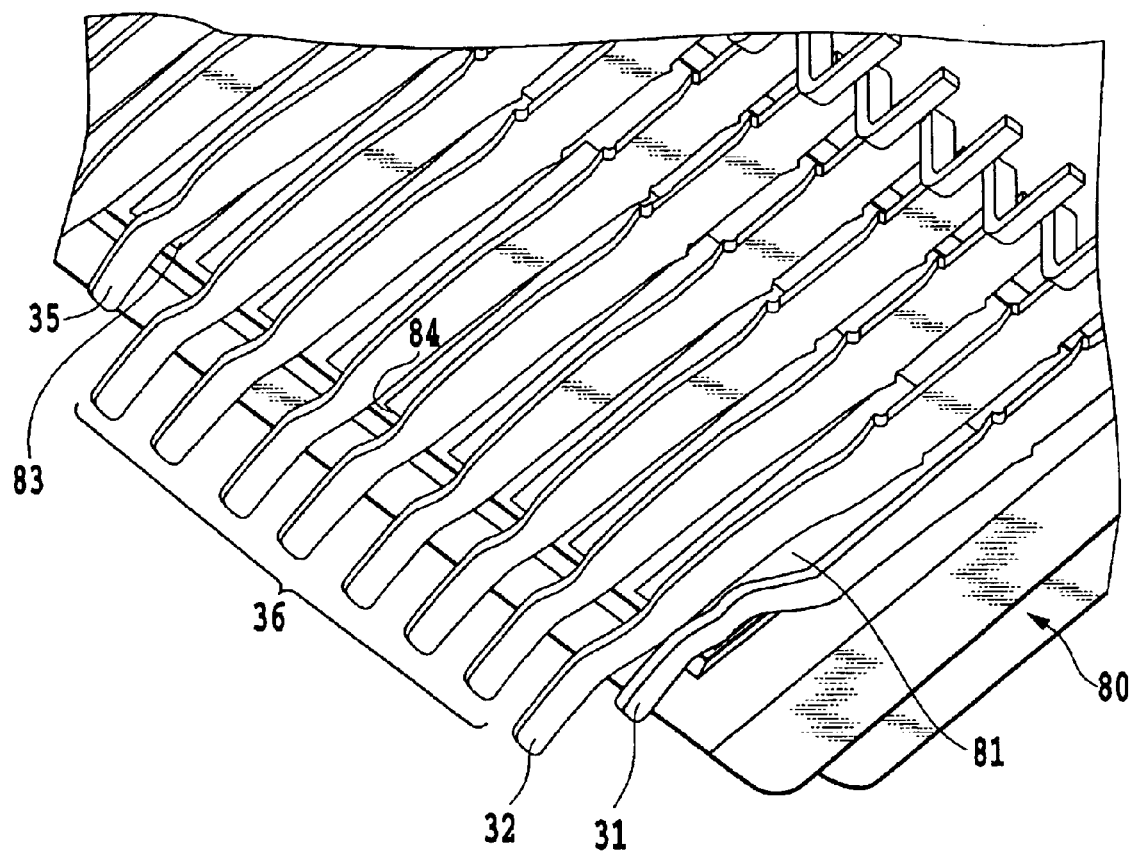
FIG. 8 is an illustration showing the condition in which the first contact terminal of the card connector begins to come into contact with the corresponding pad of the IC card as the insertion thereof progresses.
Figure 9:
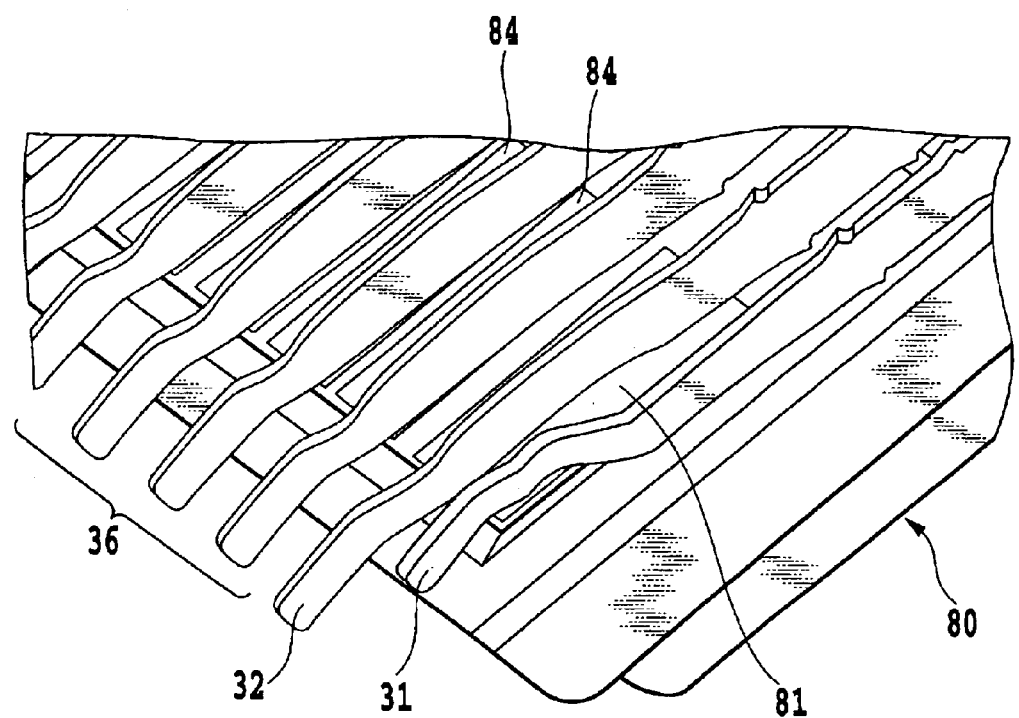
FIG. 9 is an illustration showing the condition in which the second contact terminal of the card connector begins to come into contact with the corresponding pad of the IC card as the insertion thereof progresses.
Figure 10:
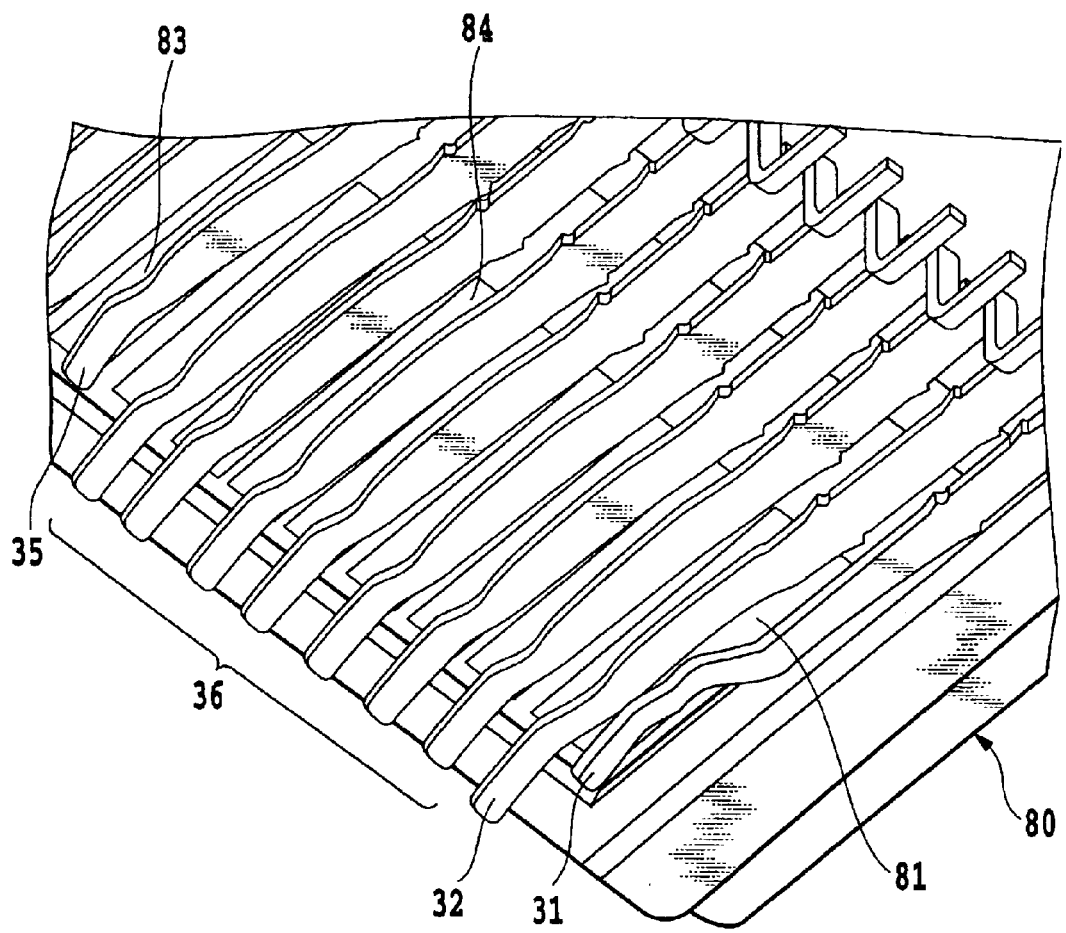
FIG. 10 is an illustration showing the condition in which the last contact terminal of the card connector begins to come into contact with the corresponding pad of the IC card as the insertion thereof progresses.
Figure 11:
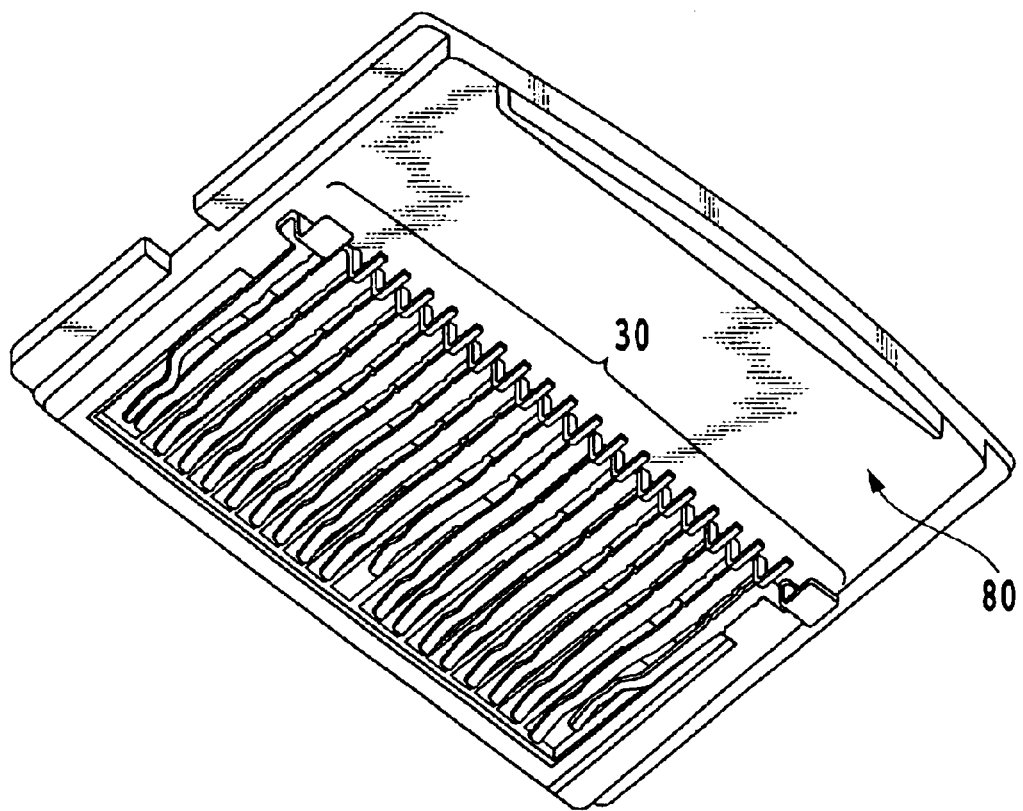
FIG. 11 is an illustration showing the condition in which all the contact terminals are in contact with all the pads of the inserted IC card.
Figure 12:
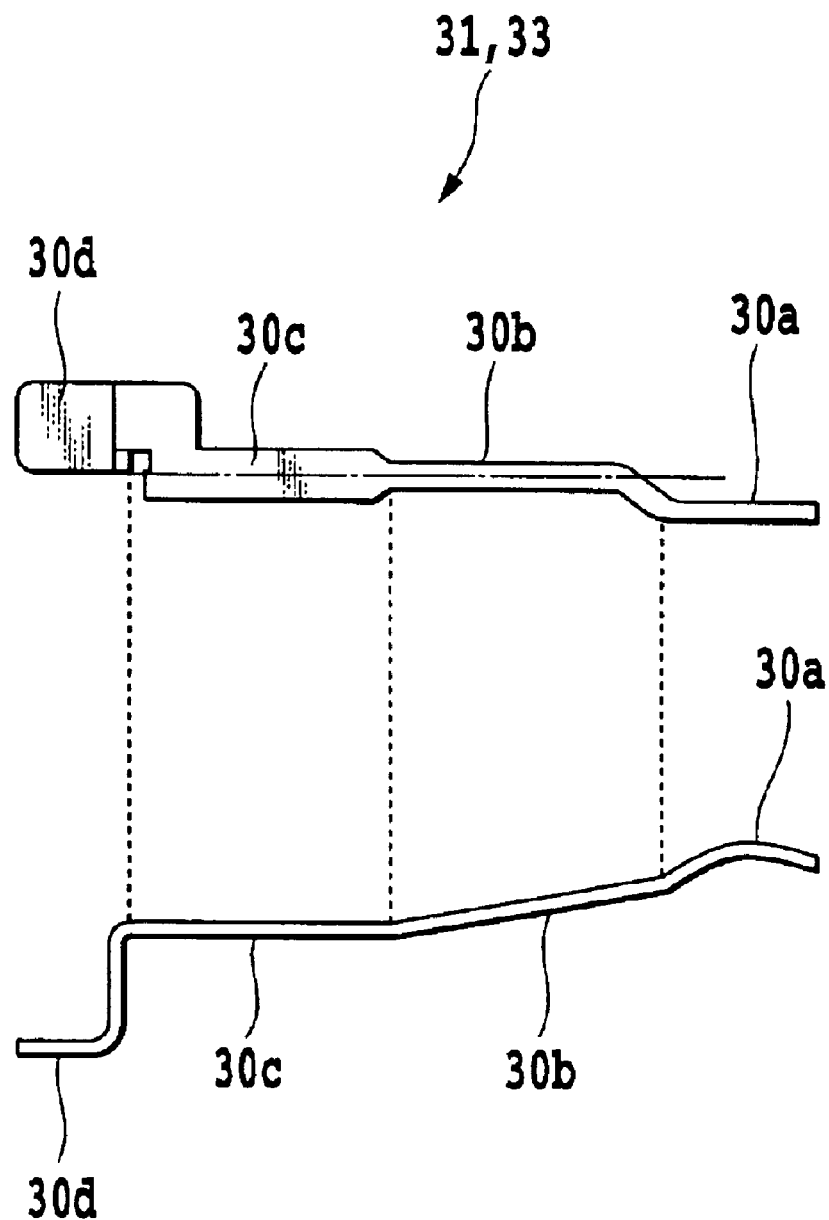
FIG. 12 is a plan and the side view of the contact terminal disposed at the outermost end of the card connector.
Figure 13:
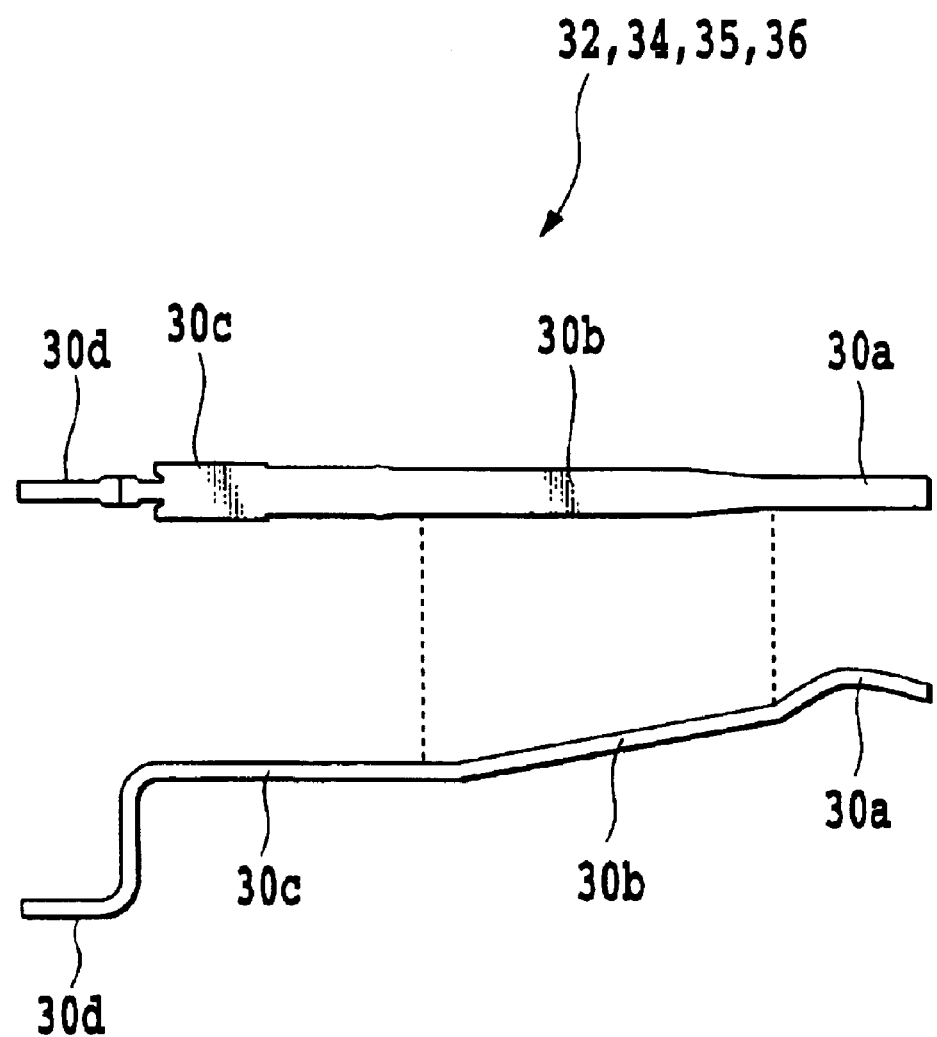
FIG. 13 is the plan and the side view of other contact terminals.

FIGS. 7 through 10 illustrate the fashion of the contact between the pads of the IC card and the contact terminals. FIG. 7 illustrates the state without any contact between the contact terminals and the pads. FIG. 8 illustrates the point at which the first contact terminal starts to contact the corresponding pad. FIG. 9 illustrates the point at which the second contact terminal starts to contact the corresponding pad. FIG. 10 illustrates the point at which the last contact terminal started to contact the corresponding pad. FIG. 11 illustrates the point at which all the contact terminals completed their contacts with the pads. FIGS. 12 and 13 illustrate the detail of the contact terminal respectively; FIG. 12 is plan view and side view of the contact terminal disposed at the outermost end, while FIG. 13 shows the plan view and the side view of other contact terminals.

A plurality of contact terminals 30 are, as illustrated in FIG. 6, fixed within the grooves 25, which are formed with the lower housing 20 and arranged in the direction of X in which the IC card is to be inserted and in parallel to one another.

In FIG. 6, the contact terminal 31, which appears at one of the outermost ends of the contact terminals, at the top end in FIG. 6, is a first contact terminal for grounding. The contact terminal 32 appearing immediately below the contact terminal 31 for grounding in the diagram is a contact terminal for detecting a card. Further, in FIG. 6, the contact terminal 33 appearing at the lowermost end or the other outermost end of the contact terminals in the diagram is a first contact terminal for connection with the power source, while the contact terminal 34 appearing immediately above the contact terminal 33 is a second contact terminal for connection with the power source. Further, the contact terminal 35 appearing at about the center (corresponding to the 10th contact terminal from the first grounding terminal according to the present embodiment) is a second contact terminal for grounding. All other contact terminals 36 are the contact terminals for communicating.

Concerning the lengths of the contact terminals 30 along the direction X in which the IC card is to be inserted, the second contact terminal 35 for grounding is shortest of all the contact terminals 30, while the contact terminal 32 for detecting the card is longest of all. Since it is necessary to ground preceding to contact with the signal line due to the reason relating to the control sequence of the electronic apparatuses, the length of the second contact terminal 35 for grounding is made shortest of all so that the contact terminal for grounding can be electrically connected first with the pad of the IC card 80. On the other hand, since the contact terminal 32 for detecting the card is provided for checking if the IC card 80 is surely inserted into the card connector 1, it is made longest of all so as to be able to come into contact last with the pad.

Other contact terminals may have any length as far as their lengths are between those of the second contact terminal 35 for grounding and the contact terminal 32 for detecting the card, but at least the first contact terminal 31 for grounding is preferred to be shorter than the first and the second contact terminals 33 and 34 for connecting with the power source. For instance, in the case of the present embodiment, the first contact terminal 31 for grounding has the second shortest length among all the contact terminals. Further, the first contact terminal 33 for connecting with the power source and the second contact terminal 34 for connecting with the power source are preferred to differ both in form and length, as described hereinafter.

Both of the first contact terminal 31 for grounding and the contact terminals 32 for detecting the card come into contact with the wide pad 81, for grounding and detecting the IC card, of the IC card 80. Further, the two contact terminals, i.e., the first and the second contact terminals 33 and 34 for connecting with the power source, also come into contact with the wide pad 82, for connecting with the power source, of the IC card 80. Further, the second contact terminal 35 for grounding comes into contact with the pad 83, for grounding, of the IC card 80. Other contact terminals 36 for communicating come into contact respectively with the corresponding pad 83 for communicating of the IC card 80.

Next, the structure of each of the contact terminals 30 will be described. As illustrated in FIGS. 12 and 13, each of the contact terminals 30 comprise a front-end contact 30a for contacting with the pad of IC card 80, an elastic portion 30b, a stationary portion 30c fixed with the fixing groove 25 of the lower housing 20, and a soldering portion 30d to be fixed by being soldered to the corresponding connection terminal of the printed circuit board.

The front-end contact portion 30a and the elastic portion 30b of each contact terminal come above the through hole 26 when the contact terminals 30 are pushed into the fixing groove 25 to be fixed by way of the stationary portion 30c. Thus, the soldering portion 30d is disposed on the side for the insertion of the IC card. By being arranged in this way, the contact portion 30a and the elastic portion 30b are allowed to deform freely without coming into contact with the bottom 21 of the lower housing 20.

Further, as shown in FIG. 12, the front-end contact portion 30a and the soldering portion 30d, disposed at the opposite outermost ends of the contact terminals respectively, are unsymmetrical to each other with respect to the central axis of the stationary portion 30c fixed with the fixing groove 25 of the lower housing 20, and are disposed at opposite sides with respect to the central axis. Forming the contact terminals 31 and 33, which are disposed on the opposite outermost ends of the contact terminals respectively, as described above, enables two contact terminals, i.e., the contact terminal having larger width from the stationary portion 30c to the soldering portion 30d and another contact terminal (e.g., the contact terminals 31 and 32, or 33 and 34 according to the present embodiment) to contact with each of the wide pads 81 and 82 disposed at opposite ends of a plurality of pads on the IC card 80. More particularly, for instance, the contact portion 30a of the first contact terminal 31 for grounding and that of the contact terminal 32 for the detecting the card can be disposed closer to each other. As shown in FIG. 13, other contact terminals 30 are formed symmetrically with respect to the central axis of the stationary portion 30c.

Further, the widths of the contact terminals 31 and 32 are enlarged respectively from the stationary portions 30c thereof to the soldering portions 30d thereof, so that the masses of the contact terminals 31 and 32 are made greater than those of other contact terminals. By being configured in this way, the resonant frequencies of the contact terminals 31 and 33 can be differentiated from those of other contact terminals.

Next, the fashion in which the plurality of contact terminals are made to come into contact with the pads 81 through 84 of the IC card 80 when the IC card 80 is inserted into the card connector 1 will be described referring to FIGS. 7 through 11. FIGS. 7 through 11 show only the contact between the IC card 80 and the contact terminals 30 for the ease of understanding.

The condition where the IC card 80 is inserted into the card connector 1, and the contact terminals 30 are about to come into contact with the pads of the IC card 80 is illustrated in FIG. 7. In this condition, when the IC card 80 is inserted further, the shortest second terminal 35 for grounding first come into contact with the pad 83 for grounding, as shown in FIG. 8. This shortest second contact terminal 35 for grounding is disposed substantially at the middle among the contact terminals, as mentioned above. Since the contact terminals are arranged in this way, the degree of disagreement between the pads of the IC card and the contact terminals resulting from the inclination of the inserted IC card 80 (particularly, it is conspicuous that the degree is increased in the case of the rectangular card, such as the present embodiment, having two longer sides perpendicular to the card inserting direction X) is reduced to a smallest possible extent at the point, which is substantially at the middle among the contact terminals. Thus, the second terminal 35 for grounding, whose length is shortest of all, can be made to come into contact first and surely with the pad 83 for grounding.

Subsequently, as shown in FIG. 9, the first contact terminal 31 for grounding comes into contact with the pad 81 for grounding and detecting the IC card, which has an enlarged width. Subsequently, the first and the second terminals 33 and 34 for connecting with the power source come into contact respectively with the pad 82 having an enlarged width, while the plurality contact terminals 36 for communicating come into contact with the corresponding pads 84 for communicating.

Lastly, as shown in FIG. 10, the contact terminal 32 for detecting the card comes into contact with the pad 81 for grounding and detecting the IC card, which has an enlarged width. In this way, the voltage applied across the first contact terminal 31 for grounding is short-circuited to the side of grounding through the contact terminal 32 for detecting the card. At this point, from the change in the voltage, it can be detected that the connections between all the pads of the IC card 80 and all the contact terminals of the card connector are effected or that the IC card 80 is securely inserted into the card connector 1.

When the IC card 80 is completely inserted into the card connector 1, the condition illustrated in FIG. 11 is maintained. In this state, the predetermined functions can be performed through the exchange of the signal between the IC card 80 and the electronic apparatus.

Concerning the present embodiment, as shown in FIG. 6, the description has been made previously as to the case where, with respect to each of the contact terminals 30, the contact portion 30a is disposed at the farthest side with respect to the card inserting direction X while the soldering portion 30d is disposed at the nearest side when being fixed to the fixing groove of the lower housing. However, the contact terminals 30 may be fixed inversely as long as corresponding to the IC card to be inserted. In other words, each of the contact terminals 30 may be arranged so that the contact portion 30a is disposed on the near side with respect to the card inserting direction X while the soldering portion 30d is disposed on the farthest side when being fixed with the fixing groove 25 of the lower housing.

In this case, as easily understood, it is necessary for the second contact terminal 35 for grounding, which comes into contact first with the pad of the IC card 80, to be made longest of all the contact terminals 30. Contact terminal 32, for detecting the card, is the contact terminal that comes into contact with the IC card 80 last, and, therefore, should be the shortest of the contact terminals 30.

Figure 14A:
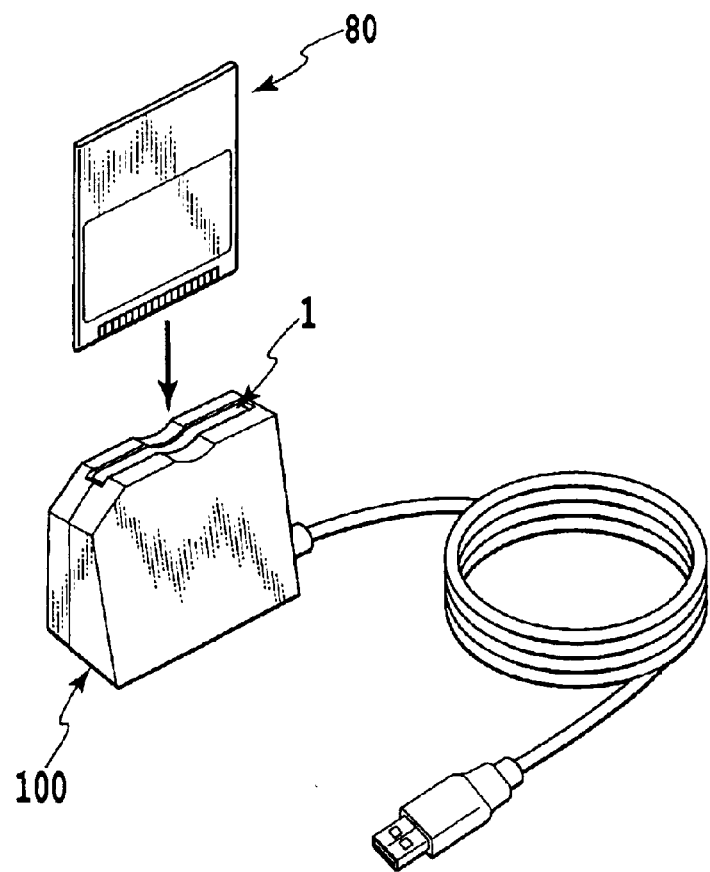
FIGS. 14A and 14B show the external views of the USB reader/writer, which is one of the examples of the application of the card connector according to the present invention.
Figure 14B:
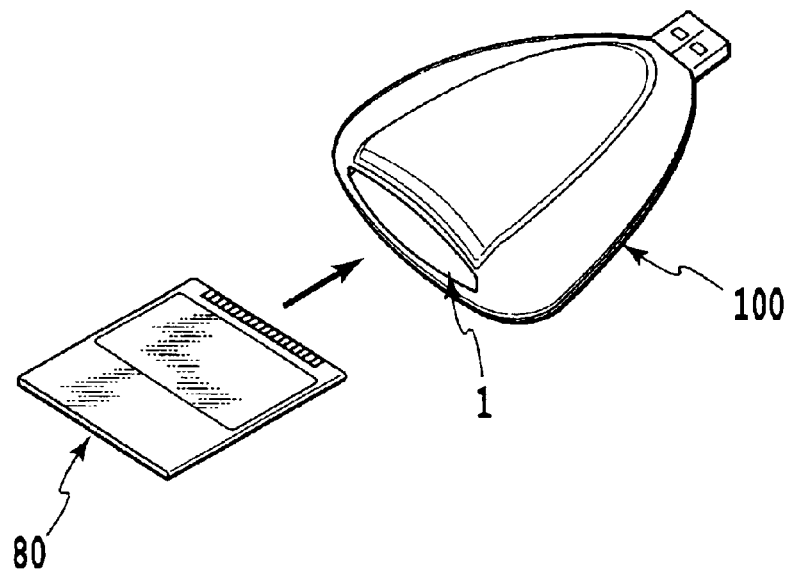
Figure 15:
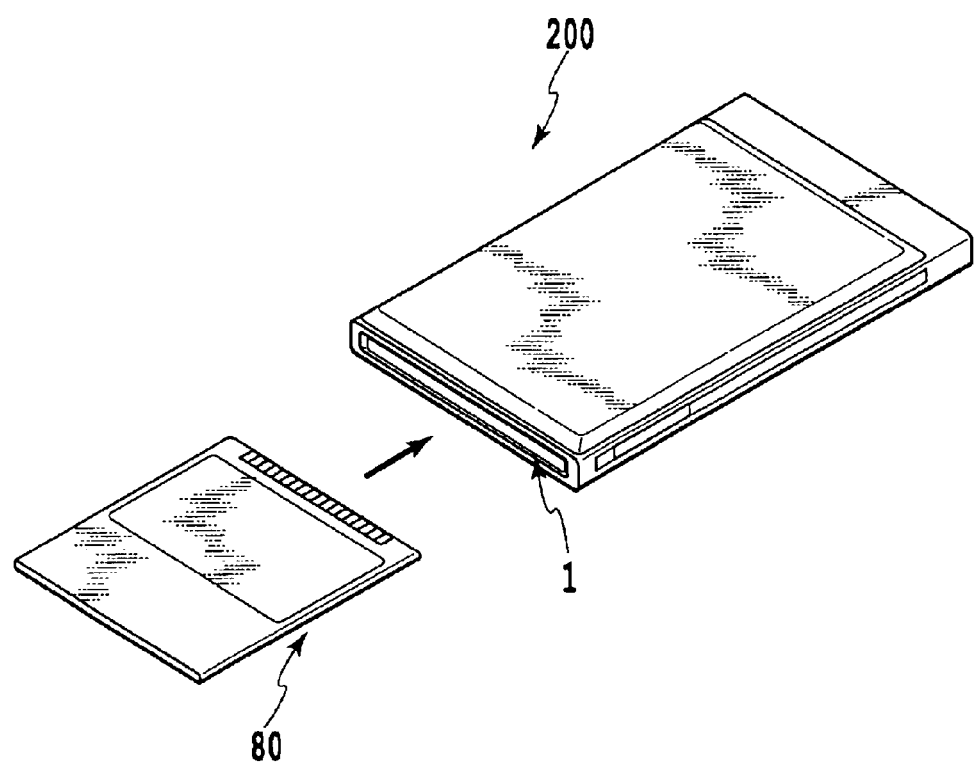
FIG. 15 shows the external view of the personal computer card adaptor, which is one of the examples of the application of the card connector according to the present invention.

Further, FIGS. 14A, 14B and 15 show the examples of the actual applications of the card connector according to the present invention as is discussed above to the USB reader/writer 100 and the personal computer card adapter 200 respectively.

The connectors of the small-size apparatuses such as the digital camera, portable information equipment, mobile telephone, USB reader/writer are apt to be subjected to a large impact or vibration while the apparatuses are in use, and so the structure of the connector according to the present invention will be useful for overcoming such problem.

As described in the foregoing, the card connector according to the present invention has a structure wherein a pad, disposed at one end of the IC card, has a larger width than those of other pads for obtaining simultaneous contact with 2 contact terminals (i.e., one for grounding and the other for detecting the card), thereby making it possible to detect the loading of the card by means of the short-circuit between the two contacts. In this way, it can be made possible not only to simplify the structure of the card connector but also to reduce the number of parts compared with the conventional structure.

Besides, in the present embodiment, both the contact terminal for connecting with the power source and the contact terminal for grounding are not only provided in two units respectively but also designed to have resonant frequencies differing from each other, whereby at least one of the two contact terminals can be made always in contact with the corresponding pad even while being influenced by the vibration or the impact, so that the reliability and the durability of the electrical connection between the IC card and the electronic apparatus can be improved.

Further, it is designed that at least one of the two terminals for grounding is not only disposed substantially at the center but also is made to come into contact first with the corresponding external contact or the corresponding pad of the IC card, that is, the terminal for grounding is made to come into contact first with the pad of the IC card prior to other pads such as the pad for connecting with the power source or the pad for the signal, so that sure and stable connection can be made to the sequence of the circuits formed by the electronic apparatus and the IC card.

Further, it is designed that the contact terminal for detecting the card comes into contact last with the corresponding external contact of the IC card, thereby enabling the IC card to be loaded securely.

Besides, since the contact terminals disposed on the outermost ends of the card connector have unsymmetrical forms respectively, the two contact terminals can be made to come into contact with the pads disposed on the outermost ends of the IC card respectively.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A contacting structure of a card connector, the card connector comprising a plurality of contact terminals arranged in parallel with one another along an IC card inserting direction corresponding to a plurality of external contacts of the IC card, wherein, among said plurality of contact terminals, at least two are contact terminals for connecting with a power source, among said plurality of contact terminals not including said contact terminals for connecting with the power source, at least two are contact terminals for grounding, among said plurality of contact terminals not including said contact terminals for connecting with the power source and further not including said contact terminals for grounding, at least one is a contact terminal for detecting whether the IC card has been loaded securely into the card connector, among said plurality of contact terminals, one of the at least two contact terminals for grounding comes into contact first with a corresponding external contact of the IC card, among said plurality of contact terminals, said contact terminal for detecting the IC card comes into contact last with a corresponding external contact of the IC card, and one of said at least two contact terminals for grounding and said contact terminal for detecting the IC card both come into contact with one external contact disposed at one of the outermost ends of a plurality of external contacts on said IC card.

2. A contacting structure of the card connector as claimed in claim 1, wherein out of said one of said at least two contact terminals for grounding and said contact terminal for detecting the IC card, the contact terminal disposed at the outermost end of a plurality of contact terminals on the card connector is unsymmetrical in form with respect to a central axis of the contact terminal.

3. The contacting structure of a card connector as claimed in claim 1, wherein a resonant frequency of at least two terminals for grounding differs from each other.

4. A contacting structure of a card connector, the card connector comprising a plurality of contact terminals arranged in parallel with one another along an IC card inserting direction corresponding to a plurality of external contacts of the IC card, wherein, among said plurality of contact terminals, at least two are contact terminals for connecting with a power source;

among said plurality of contact terminals not including said contact terminals for connecting with the power source, at least two are contact terminals for grounding;

among the plurality of the contact terminals not including the contact terminals for connecting with the power source and the contact terminals for grounding, at least one is contact terminal for detecting whether the IC card has been loaded securely into the card connector;

said at least two terminals for connecting with the power source are in contact with one external contact disposed at the other outermost end of a said plurality of external contacts on said IC card.

5. The contacting structure of a card connector as claimed in claim 4, wherein, out of said two terminals for connecting with the power source, the contact terminal disposed at the outermost end is asymmetric with respect to the central axis of the fixing portion of the contact terminal.

6. A contacting structure of a card connector as claimed in claim 4, said at least two terminals for connecting with the power source have different resonant frequencies.

7. A contacting structure of a card connector, the card connector comprising a plurality of contact terminals arranged in parallel with one another along the direction of the insertion of said IC card and corresponding to the plurality of external contacts of the IC card, wherein, among said plurality of contact terminals, at least two are contact terminals for connecting with the power source;

among said plurality of contact terminals not including said contact terminals for connecting with power source, at least two are contact terminals for grounding;

among said plurality of contact terminals not including said contact terminals for connecting with the power source and said contact terminals for grounding, at least one is a contact terminal for detecting whether the IC card has been loaded securely into the card connector;

said at least two contact terminals for connecting with the power source are in contact with one external contact disposed at another end of the outermost ends of said IC card;

among said plurality of contact terminals, one of said at least two terminals for grounding first comes into contact with the corresponding external contact of the IC card;

among said plurality of contact terminals, said contact terminal for detecting the card comes into contact last with a corresponding external contact of the IC card; and one of said at least two contact terminals for grounding and said terminal for detecting the card come into contact with one external contact disposed at one outermost end of a plurality of external contacts on the IC card.

8. The contacting structure of a card connector as claimed in claim 7, wherein said contact terminal for grounding that comes into contact first with the external contact of the IC card is disposed substantially in the middle of the plurality of contact terminals arranged in parallel with one another.

9. A contacting structure of a card connector as claimed in claim 7, wherein, among said plurality of contact terminals, the contact terminals disposed at the outermost ends are asymmetrical with respect to the central axis of the fixing portion of said contact terminals.

10. A contacting structure of the card connector as claimed in claim 7, wherein said at least two terminals for grounding have different resonant frequencies, and said at least two terminals for connecting with power source also have different resonant frequencies.

* * * * *